United States Patent
Sartori et al.

(10) Patent No.: US 9,648,599 B2
(45) Date of Patent: May 9, 2017

(54) SYSTEM AND METHOD FOR AVOIDING COLLISIONS BETWEEN OPEN DISCOVERY AND CELLULAR RESOURCES

(71) Applicant: Futurewei Technologies, Inc., Plano, TX (US)

(72) Inventors: Philippe Sartori, Plainfield, IL (US); Vipul Desai, Palatine, IL (US); Mazin Al-Shalash, Frisco, TX (US); Anthony C. K. Soong, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 251 days.

(21) Appl. No.: 14/663,050

(22) Filed: Mar. 19, 2015

(65) Prior Publication Data
US 2015/0271810 A1 Sep. 24, 2015

Related U.S. Application Data

(60) Provisional application No. 61/968,877, filed on Mar. 21, 2014.

(51) Int. Cl.
*H04W 8/00* (2009.01)
*H04W 72/04* (2009.01)
(Continued)

(52) U.S. Cl.
CPC .......... *H04W 72/0413* (2013.01); *H04L 5/14* (2013.01); *H04W 8/005* (2013.01); *H04W 72/1284* (2013.01); *H04W 76/023* (2013.01)

(58) Field of Classification Search
CPC ......... H04W 72/0413; H04W 72/1284; H04W 8/005; H04W 76/023; H04L 5/14
See application file for complete search history.

(56) References Cited

U.S. PATENT DOCUMENTS 9,100,941 B2 * 8/2015 Ratasuk ............... H04W 76/023
9,306,721 B2 * 4/2016 Jung ..................... H04L 5/0055
(Continued)

FOREIGN PATENT DOCUMENTS

GB         201217186      11/2012
WO      2013151263 A1    10/2013

OTHER PUBLICATIONS

International Search Report and Written Opinion of Patent Cooperation Treaty (PCT), International Application No. PCT/CN2015/074818, Applicant Huawei Technologies Co., Ltd., date of mailing Jun. 19, 2015, 13 pages.

(Continued)

*Primary Examiner* — Phuc Tran
(74) *Attorney, Agent, or Firm* — Slater Matsil, LLP

(57) ABSTRACT

A method for signaling control information in a communications system includes identifying a first subframe to carry first control information, and determining whether the first subframe is configured as a device-to-device (D2D) subframe. The method also includes transmitting the first control information in the first subframe to an evolved NodeB (eNB) when the first subframe is not configured as a D2D subframe, wherein the first control information is encoded with a first encoding rule in accordance with a first subframe, and transmitting the first control information in a second subframe when the first subframe is configured as a D2D subframe, wherein the first control information is encoded with a second encoding rule in accordance with the second subframe.

33 Claims, 9 Drawing Sheets

(51) Int. Cl.
*H04L 5/14* (2006.01)
*H04W 72/12* (2009.01)
*H04W 76/02* (2009.01)

(56) References Cited

U.S. PATENT DOCUMENTS

| | | | |
|---|---|---|---|
| 9,380,442 B2* | 6/2016 | Turtinen | H04W 8/005 |
| 9,398,438 B2* | 7/2016 | Sartori | H04W 8/005 |
| 2014/0086175 A1 | 3/2014 | Hakola et al. | |
| 2014/0269338 A1* | 9/2014 | Jung | H04L 5/0055 |
| | | | 370/241 |
| 2014/0334354 A1* | 11/2014 | Sartori | H04W 8/005 |
| | | | 370/280 |
| 2014/0376489 A1* | 12/2014 | Lee | H04L 5/0055 |
| | | | 370/329 |
| 2015/0163729 A1* | 6/2015 | Seo | H04B 7/2656 |
| | | | 370/336 |
| 2016/0029333 A1* | 1/2016 | Seo | H04L 27/2655 |
| | | | 370/350 |
| 2016/0142898 A1* | 5/2016 | Poitau | H04W 72/0413 |
| | | | 370/329 |

OTHER PUBLICATIONS

"3rd Generation Partnership Project; Technical Specification Group Services and System Aspects; Feasibility study for Proximity Service (ProSe) (Release 12)," 3GPP TR 22.803 v12.0.0, Technical Report, Lte, Dec. 2012, 40 pages.

* cited by examiner

SYSTEM AND METHOD FOR AVOIDING COLLISIONS BETWEEN OPEN DISCOVERY AND CELLULAR RESOURCES

This application claims the benefit of U.S. Provisional Application No. 61/968,877, filed on Mar. 21, 2014, entitled "System and Method for Avoiding Collisions between Open Discovery and Cellular Resources," which application is hereby incorporated herein by reference.

TECHNICAL FIELD

The present disclosure relates generally to digital communications, and more particularly to a system and method for avoiding collisions between open discovery and cellular resources.

BACKGROUND

Device-to-device (D2D) technology is attractive and obtaining considerable attention because of its ability to offer new services, improve system throughput, and offer a better user experience. There are two main identified D2D technologies: discovery and communication. In discovery, a user equipment (UE) attempts to discover neighboring UEs, either on its own or directed by the enhanced Node B (eNB). In communication, one UE directly communicates with another UE without the data transiting through the eNB. A D2D link is a direct communication between two UEs, without having the radio bearer for the communication transiting through the eNB.

There are two main ways of performing discovery: eNB-assisted discovery and open discovery. With eNB-assisted discovery, one UE is directed to transmit a signal (e.g., a sounding reference signal (SRS) signal), and another UE is required to listen and report the signal quality to the eNB. The eNB can, based on this reported signal quality, decide if proximity services (ProSe) can be enabled for these two UEs. With open discovery, any UE can transmit a "beacon" signal to advertise its presence to other UEs. Note that this process can possibly involve UEs in the idle state (idle UEs). In 3GPP, a UE can have logical operating states: idle and connected (radio resource control (RRC)-connected). 3GPP defines open discovery as a Type 1 discovery procedure where resources for discovery signal transmission are allocated on a non-UE-specific basis. eNB-assisted discovery is noted as a Type 2 discovery procedure where resources for discovery signal transmission are allocated on a per UE specific basis. Further, Type 2A discovery is where resources are allocated for each specific transmission instance of discovery signals while Type 2B discovery has resources semi-persistently allocated for discovery signal transmission.

SUMMARY OF THE DISCLOSURE

Example embodiments of the present disclosure provide a system and method for avoiding collisions between open discovery and cellular resources.

In accordance with an example embodiment of the present disclosure, a method for signaling first control information in a communications system is provided. The method includes identifying, by a user equipment (UE), a first subframe to carry the first control information, and determining, by the UE, whether the first subframe is configured as a device-to-device (D2D) subframe. The method includes transmitting, by the UE, the first control information in the first subframe to an evolved NodeB (eNB) when the first subframe is not configured as a D2D subframe, wherein the first control information is encoded with a first encoding rule in accordance with a first subframe, and transmitting, by the UE, the first control information in a second subframe when the first subframe is configured as a D2D subframe, wherein the first control information is encoded with a second encoding rule in accordance with the second subframe.

In accordance with another example embodiment of the present disclosure, a method for receiving control information in a communications system is provided. The method includes receiving, by an evolved NodeB (eNB), encoded control information in a first subframe, and determining, by the eNB, a coding rule used in encoding the control information, wherein the coding rule is one of a first coding rule and a second coding rule. The method includes decoding, by the eNB, the encoded control information in accordance with the coding rule to produce the control information, wherein the second coding rule is used as the coding rule when the control information comprises second control information scheduled for a second subframe configured as a device-to-device (D2D) subframe and when the second control information was not received on the second subframe.

In accordance with another example embodiment of the present disclosure, a user equipment (UE) adapted to signal first control information in a communications system is provided. The UE includes a processor, and a computer readable storage medium storing programming for execution by the processor. The programming including instructions to identify a first subframe to carry the first control information, determine whether the first subframe is configured as a device-to-device (D2D) subframe, transmit the first control information in the first subframe to an evolved NodeB (eNB) when the first subframe is not configured as a D2D subframe, wherein the first control information is encoded with a first encoding rule in accordance with a first subframe, and transmit the first control information in a second subframe when the first subframe is configured as a D2D subframe, wherein the first control information is encoded with a second encoding rule in accordance with the second subframe.

In accordance with another example embodiment of the present disclosure, an evolved NodeB (eNB) adapted to signal control information in a communications system is provided. The eNB includes a processor, and a computer readable storage medium storing programming for execution by the processor. The programming including instructions to receive encoded control information on a first subframe, determine a coding rule used in encoding the control information, wherein the coding rule is one of a first coding rule and a second coding rule, and decode the encoded control information in accordance with the coding rule to produce the control information, wherein the second coding rule is used as the coding rule when the control information comprises second control information scheduled for a second subframe configured as a device-to-device (D2D) subframe and when the second control information was not received on the second subframe.

Practice of the foregoing embodiments reduces collisions between open discovery and cellular resources, thereby improving overall communications system performance.

Moreover, signaling is not required to reduce collisions between open discovery and cellular resources, thereby reducing communications system overhead.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to avoiding collisions between open discovery and cellular resources. For example, a user equipment (UE) identifies a first subframe to carry first control information, and determines whether the first subframe is configured as a device-to-device (D2D) subframe. The UE transmits the first control information in the first subframe to an evolved NodeB (eNB) when the first subframe is not configured as a D2D subframe, wherein the first control information is encoded with a first encoding rule in accordance with a first subframe. The UE transmits the first control information in a second subframe when the first subframe is configured as a D2D subframe, wherein the first control information is encoded with a second encoding rule in accordance with the second subframe.

The present disclosure will be described with respect to example embodiments in a specific context, namely communications systems that support the coexistence of D2D and cellular communications devices. The disclosure may be applied to standards compliant communications systems, such as those that are compliant with Third Generation Partnership Project (3GPP), IEEE 802.11, and the like, technical standards, and non-standards compliant communications systems, that support the coexistence of D2D and cellular communications devices.

Figure 1:
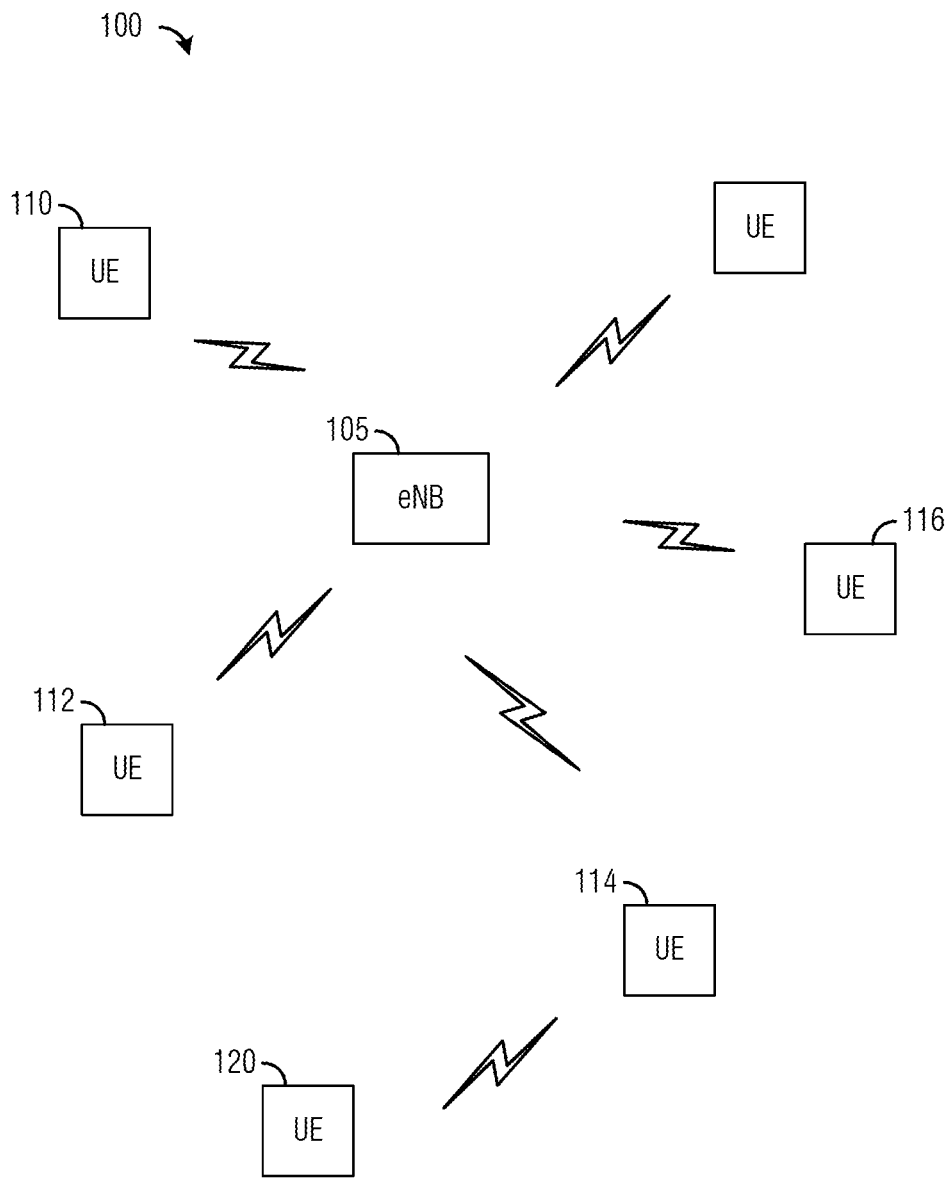
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, UE 112, UE 114, and UE 116. eNB 105 is serving the plurality of UEs by receiving transmission intended for a UE and then forwarding the transmitting to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobiles, mobile stations, terminals, users, subscribers, stations, and the like.

D2D communications is a different operating mode where UEs can directly transmit to one another without having their transmissions being relayed by an eNB. As shown in FIG. 1, UE 114 is communicating directly with UE 120. UE 114 may be capable of communicating in the cellular mode as well as in the D2D mode. UE 120 is operating in a D2D mode, but it may also be possible that UE 120 is capable of operating in the cellular mode with eNB 105 or even with a different eNB (e.g., in another cell). However, such operations involving UE 120 are not shown in FIG. 1.

While it is understood that communications systems may employ multiple eNBs capable of communicating with a number of UEs, only one eNB, and a number of UEs are illustrated for simplicity.

Generally, there are several ways to implement D2D communications. A first way to implement D2D communications is referred to as device centric. In the device centric approach, the UEs may initiate D2D connections with other UEs without communications system oversight. In fact, D2D communications between UEs may form an overlay on top of the cellular network. The traditional functions of the cellular networks, such as resource allocation and management, are performed in an ad-hoc manner between the individual UEs, without the benefit of network oversight or management. A second way to implement D2D communications is referred to as network centric (network managed). In the network centric approach, the communications system initiates a D2D connection when conditions are appropriate. Conditions may include local parameters, such as proximity of UEs to each other, as well as macro parameters, such as overall traffic demand, location of non-D2D UEs, and the like. The network centric approach may be attractive to communications system operators because the D2D operation may enhance the performance of the communications system (such as efficient resource utilization, minimizing interference, and the like), while allowing the operators to bill for services. 3GPP has defined two modes for D2D communications. For Mode 1, the location of the resources for transmission of the scheduling assignment by the broadcasting (transmitting) UE comes from the eNB and the location of the resource(s) for transmission of the D2D data by the broadcasting UE comes from the eNB. For Mode 2, a resource pool for scheduling assignment is pre-configured and/or semi-statically allocated by the eNB, and UE on its own selects the resource for scheduling assignment from the resource pool for scheduling assignment to transmit its scheduling assignment.

Figure 2:
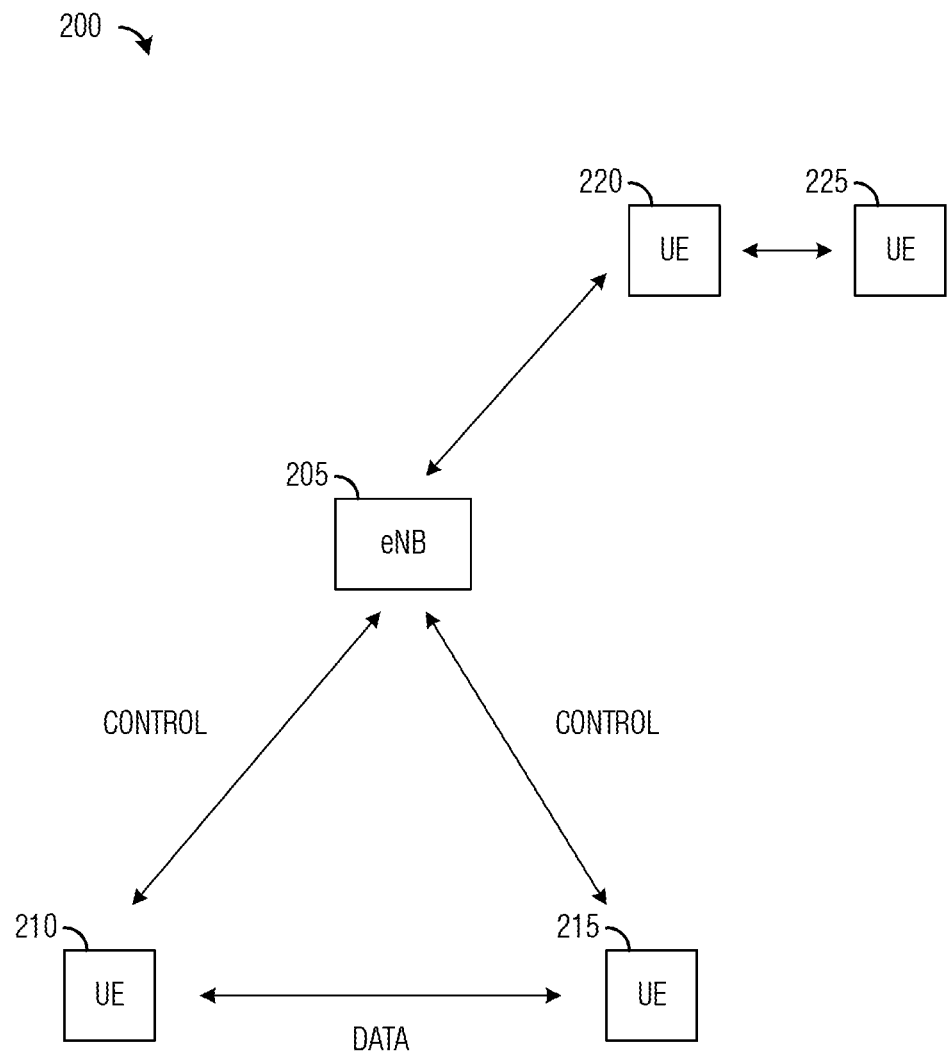
FIG. 2 illustrates an example communications system highlighting network centric (managed) D2D operation according to example embodiments described herein.

FIG. 2 illustrates an example communications system 200 highlighting network centric D2D operation. Communications system 200 includes an eNB 205, a first UE 210, and a second UE 215. As shown in FIG. 2, eNB 205 may exchange control signaling with at least one of first UE 210 and second UE 215 to perform D2D operations between first UE 210 and second UE 215. Afterwards, first UE 210 and second UE 215 may exchange data without requiring intervention from eNB 205. In a similar situation, eNB 205 may exchange control signaling with UE 220 to perform D2D operations and UE 220 and UE 225 may exchange data without requiring intervention from eNB 205.

It is generally envisioned that D2D direct discovery resources and cellular resources are multiplexed, with the D2D discovery resources occupying either the uplink (UL) or downlink (DL) band. Along with D2D discovery, it is desirable for normal cellular operation to be maintained for UEs not participating in the discovery process, in particular, 3GPP LTE Release (rel)-11 UEs or earlier. However, there are some implicit timing rules for cellular UEs. For instance, for frequency division duplex (FDD) operation, if a UE receives an DL packet on frame N, the acknowledgment/negative acknowledgment (ACK/NAK) is sent on subframe N+4. Introducing UL (DL, respectively) subframes that are not paired with a DL subframe (UL, respectively) can break some existing timelines.

Embodiment systems and methods ensure that cellular and D2D subframes (e.g., D2D discovery subframes, as well as D2D communications subframes) do not collide, and handle collisions. An embodiment provides a discovery subframe allocation mechanism. In an embodiment, rel-12 UEs handle the interrupted UL transmission timeline. An embodiment discovery subframe allocation process minimizes the impact on hybrid automatic repeat request (HARQ) processes and regular source coding outputs, thus allowing a better integration of D2D discovery LTE. An embodiment method ensures that cellular operation (e.g., PUCCH transmission) is not affected by D2D and that the quality of service (QoS) is maintained on the UL (HARQ processes put on hold or deferred). Embodiments may be implemented in wireless networks, such as LTE, and wireless devices, such as UEs, eNBs, and the like.

Given that open discovery involves idle UEs, it is performed with very limited available information to both the UEs and eNB. In particular, these UEs typically have to rely on the information broadcasted by the eNB. It would be too costly in most cases to wake up (have UEs transition from the idle state to the connected state) these UEs and transmit radio resource control (RRC) signaling to them. Furthermore, the location of each idle UE is approximate, and the exact cell where the idle UE camps is not known by the network.

For D2D, it is also generally assumed that D2D transmission occurs on the UL portion of the bandwidth because the interference is less prejudicial to cellular UEs on the UL. A transmitting D2D UE interferes with the eNB on the UL. Consequently, as long as the D2D UE is at a reasonable distance from the eNB or if there is reasonable power control, the interference created by the D2D UE should have little impact on reception of UL signals at the eNB. Conversely, on the DL, D2D interference affects neighboring UEs, and potentially, their ability to receive synchronization channels and physical downlink control channel (PDCCH) is affected, and can result in significantly higher impact than if the D2D UE were transmitting on the UL.

Figure 3:
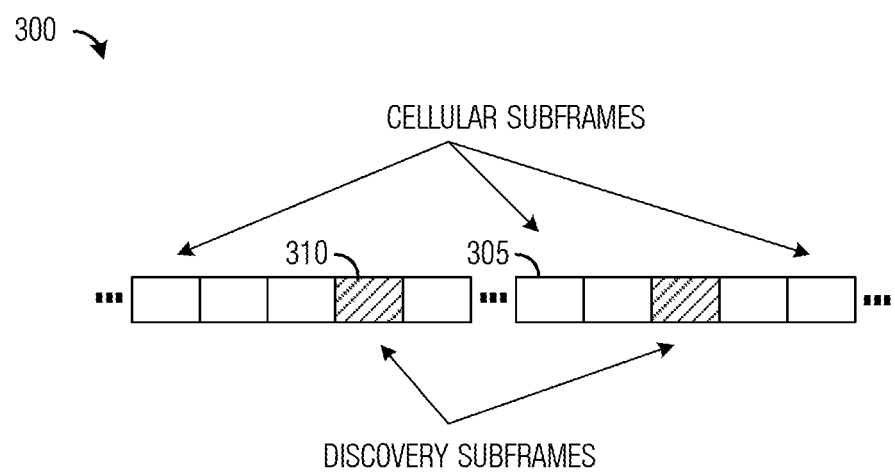
FIG. 3 illustrates an example resources with some resources allocated in accordance with D2D Mode 1 according to example embodiments described herein.

FIG. 3 illustrates example resources 300 with some resources allocated in accordance with D2D type 1 discovery. Resources 300 includes resources allocated for cellular communications, such as resource 305, and resources allocated for D2D discovery, such as a subset of resource 310, with the subset of resource 310 being allocated for use by a specific UE(s) for D2D communications. For open discovery, a given number of subframes (e.g., 1%) are reserved for discovery. During these subframes, there usually is no cellular communication at all. Only UE discovery signals are transmitted. Note that while described for D2D discovery, the invention may apply for D2D communication as well, in case all or part of a subframe is used for D2D communication.

In addition, UEs engaging in cellular communication through the eNB may need to transmit a physical uplink control channel (PUCCH). The PUCCH is used for sending ACKs/NAKs for scheduled DL packets (DL HARQ), channel quality information (CQI), uplink control information (UCI) when the UE needs to request a transmission for a packet (e.g., scheduling request (SR)). Currently, the LTE specifications do not prevent the PUCCH from being sent on a discovery subframe. For the receiving eNB and the receiving D2D UEs, this may cause some interference issues because the PUCCH and the discovery signals use different timing references. There is the potential for severe inter-carrier interference (ICI) and inter-symbol interference (ISI). This may prevent the discovery signals from being correctly received by some D2D UEs. This also may prevent the PUCCH from being correctly received by the eNB. In addition, UEs employ power control for uplink transmissions so that the received signals at the eNB are within prescribed power levels. Since discovery signals generally do not target the eNB, they are sent at higher powers. There is a possibility that a received discovery signal is at a much higher power level than a received PUCCH at the eNB. In this case, the presence of the discovery signal may hinder the processing of the PUCCH signal at the eNB.

The first problem (the discovery signals not being correctly received by some D2D UEs) generally is not significant because the discovery signals are periodically transmitted. If a UE misses receiving some discovery signals, it will have opportunities to receive them later. The second problem (the PUCCH not being correctly received by the eNB) generally is more significant. For instance, if a eNB is unable to receive PUCCH, the eNB will miss ACKs/NAKs for downlink packets, UCI, and CQI. Missing the ACKs/NAKs is a problem in many cases because it may affect the DL quality of service (QoS). This may increase DL traffic due to retransmissions of the DL packets. If a PUCCH is incorrectly decoded by the eNB, the impact is more significant. For example, if the hybrid automatic repeat request (HARQ) processes fail because of missed ACK/NAKs, this will trigger slower, less-efficient higher-layer ARQ processes.

By intelligently locating the discovery subframes, it is possible to alleviate some of the above problems. Consider UL HARQ (transmissions of packets from the UE to the eNB and the corresponding ACK/NAK transmission on the physical HARQ indicator channel (PHICH) on the downlink). UL HARQ is synchronous; the HARQ process number is linked to the subframe number. By allocating the D2D discovery subframe with a periodicity of a multiple of 8 ms for FDD, only one HARQ process is affected. Thus, the eNB can allocate only this HARQ process to rel-12 UEs, or at least minimize the number of legacy UEs using this HARQ process. This way, the impact of the D2D discovery on cellular can be minimized with some simple restrictions on the scheduler.

There are also benefits in using a multiple of 10 ms for the discovery process: voice over internet protocol (VoIP) coders typically use a 20 ms periodicity. This was the main reason why a 10 ms radio frame was selected for rel-8 LTE. Given that for VoIP (and other traffic), the periodicity is 10 ms, using a multiple of 10 ms periodicity for the discovery subframe limits the impact on UEs having voice traffic. Furthermore, semi-persistent scheduling (SPS) signaling operates with 10 ms granularity. Combining these two conditions, allocating the D2D discovery subframes with a periodicity of a multiple of 40 ms ensures that impact on VoIP traffic and on UL HARQ is minimized. With a periodicity of 40 ms, up to 2.5% of the subframes can be assigned for D2D discovery, which should be enough for most practical cases. As examples, the periodicity may be 40 ms or subframes, 80 ms or subframes, 120 ms or subframes, 160 ms or subframes, and the like.

Several parameters are utilized in order to signal the subframe configuration:

The first parameter is a reference subframe point. It could be explicitly signaled, or implicitly known: for instance, the reference subframe (subframe#0) would be the first subframe of the superframe. The allocation would repeat over each superframe. Note that when moving from one superframe to another, the D2D discovery subframe periodicity may be briefly broken. In practice, this has no serious impact over the system design.

The second parameter is the first D2D discovery subframe (offset). For instance, if the offset is 27, the first discovery subframe would be subframe #26 (or subframe #6 of radioframe #2).

The third parameter is the periodicity (as a multiple of 40 ms). For instance, if the periodicity is 2, there would be a discovery every 80 ms.

As a summary, the eNB communicates two parameters: the offset and the periodicity. This message may be sent by RRC signaling, either dedicated or broadcasted. In one embodiment, a system information block (SIB) with all the type-1 discovery parameters is used. If the offset is 27, and the periodicity is 2, subframes #26, #26+2×40=106, #186, etc. would be the discovery subframes.

When the periodicity is set at exactly 40 ms, a simpler format can be used; the reference point can be the same as for the multicast-broadcast single-frequency network (MBSFN) configuration when a 40 ms MBSFN configuration is used. In that case, the eNB signals the subframe used in the first 40 ms, and then the 40 ms periodicity is used. Note that this could also work for non-periodic allocation: a 40-bit bitmap could be used to indicate which subframes are discovery subframes, just as with the MBSFN configuration.

Figures 4A, 4B:
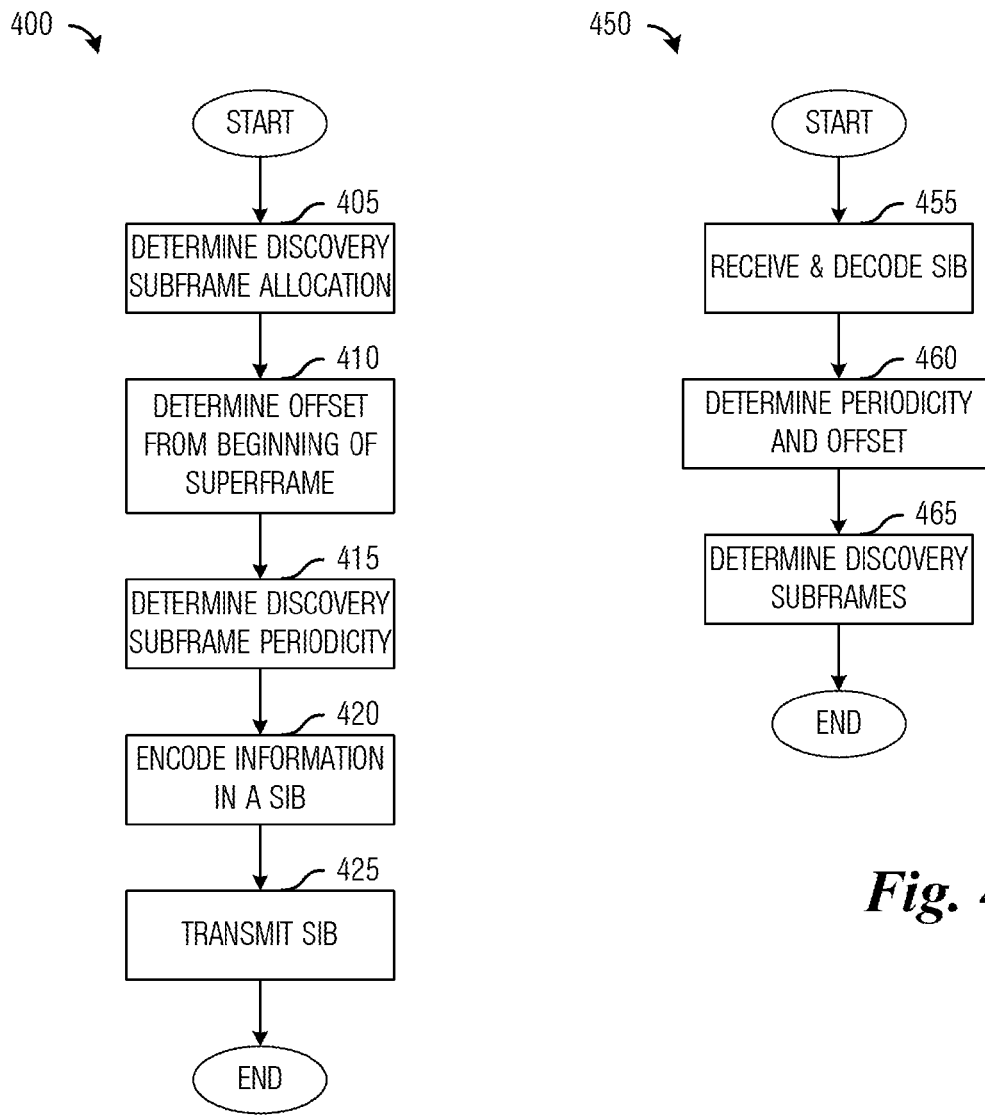
FIG. 4a illustrates a flow diagram of example operations occurring in an eNB transmitting a SIB according to example embodiments described herein.
FIG. 4b illustrates a flow diagram of example operations occurring in a UE receiving a SIB according to example embodiments described herein.

FIG. 4a illustrates a flow diagram of example operations 400 occurring in an eNB transmitting a SIB. Operations 400 may be indicative of operations occurring in an eNB as it generates and transmits a SIB.

Operations 400 may begin with the eNB determining discovery subframe allocation (block 405). In other words, the eNB is determining which subframe is to be used for open discovery. The eNB may determine an offset from the beginning of a superframe for the discovery subframe (block 410). The eNB may also determine a periodicity for the discovery subframe (block 415). The eNB may encode the offset and the periodicity in a SIB (block 420) and transmit the SIB (block 425).

FIG. 4b illustrates a flow diagram of example operations 450 occurring in a UE receiving a SIB. Operations 450 may be indicative of operations occurring in a UE as it receives and processes a SIB.

Operations 450 may begin with the UE receiving and decoding a SIB (block 455). The UE receives and decodes the SIB whether or not the UE performs D2D operations. The UE may determine the periodicity and the offset of the discovery subframe from the SIB (block 460). The UE may determine which of the subframes are the discovery subframes in accordance with the periodicity and the offset (block 465). It is noted that if periodicity is only allowed to be 40 ms, the UE may decode the D2D configuration message (using a similar format as used in the multicast broadcast single frequency network (MBSFN) configuration) and determine which subframes are discovery subframes.

With respect to PUCCH for rel-12 UEs, the rel-12 UEs can have knowledge of the discovery subframes, as explained above. The two following principles are applied. First, the rel-12 UE gets the discovery subframe configuration regardless of whether it performs D2D discovery. Second, on a D2D discovery subframe, a rel-12 UE does not send the PUCCH, regardless of whether it performs D2D discovery.

With these two principles, the question arises about when a rel-12 UE sends the PUCCH if it would normally send it on the discovery subframe. According to an example embodiment, the PUCCH is sent on the next available UL subframe. In order to encode the information, the UE may use the same procedures as for regular time division duplex (TDD) operation, even in FDD operation (ACK/NAK bundling, channel selection, use of PUCCH format 3).

Figure 5:
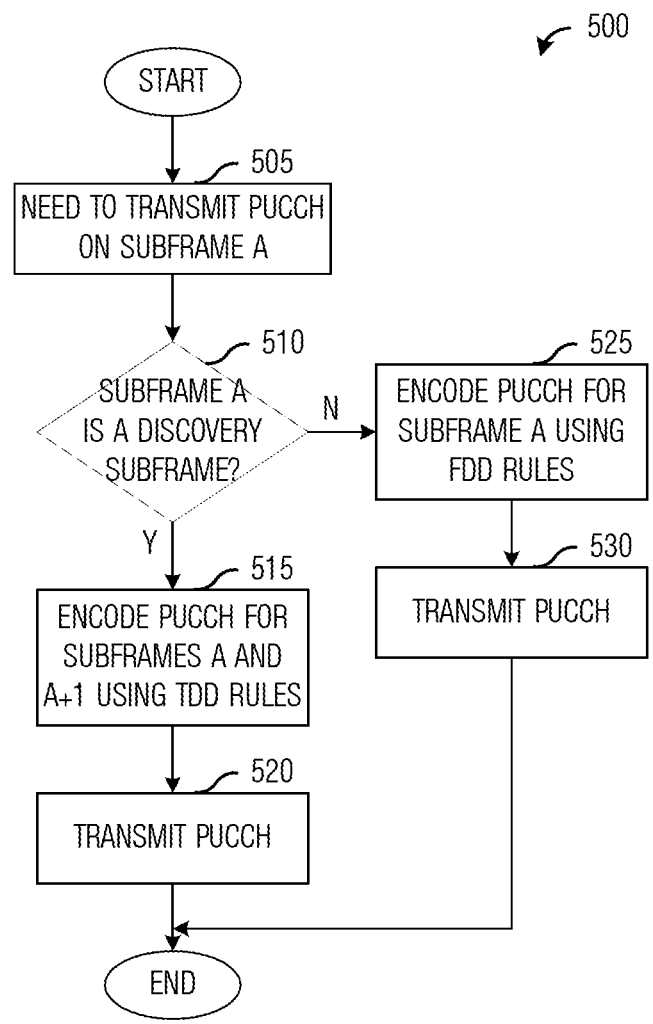
FIG. 5 illustrates a flow diagram of example operations occurring in a UE sending a PUCCH in a FDD communications system according to example embodiments described herein.

FIG. 5 illustrates a flow diagram of example operations 500 occurring in a UE sending a PUCCH in a FDD communications system. Operations 500 may be indicative of operations occurring in a UE as the UE sends a PUCCH in a FDD communications system.

Operations 500 may begin with the UE having a need to transmit a PUCCH on subframe A (block 505). The UE identifies the subframe A as the subframe where it is to transmit the PUCCH. The PUCCH is used for sending ACKs/NAKs for DL packets, CQI, UCI when the UE needs to request a transmission for a packet, and the like, for example. The UE may perform a check to determine if subframe A is a discovery subframe (block 510). If subframe A is a discovery subframe, the UE may avoid transmitting the PUCCH in subframe A. Instead, the UE may transmit the PUCCH in a next available UL subframe. The UE may encode the PUCCH for subframe A and subframe A+1 (i.e., the next available UL subframe) (block 515). The PUCCH may be encoded using TDD rules (a second encoding rule), even if the communications system is configured for FDD communications. The UE may transmit the PUCCH in subframe A+1 (block 520). It is noted that although the discussion of FIG. 5 focuses on subframes being D2D subframes (e.g., D2D discovery subframes), the example embodiments presented herein are also operable for subframes that are configured to be D2D subframes. Therefore, the discussion of subframes being D2D subframes should not be construed as being limiting to either the scope or the spirit of the example embodiments.

There are several TDD rules to encode ACK/NAKs: ACK/NAK bundling, ACK/NAK multiplexing, channel selection (CS), or a combination of these rules. With ACK/NAK bundling, if a UE has to send two ACK/NAK a(k) and a(l), the UE will send the following value: (a(k) AND a(l)), with AND being the logical AND operator, and the function a being defined as follows: a(x)=1 for an ACK for a DL packet received in subframe x, and a(x)=0 if a NAK for a DL packet in subframe x. Thus, with bundling, a single bit is sent to encode all the ACK/NAKs to be sent on a given subframe.

Using the TDD rules with ACK/NAK bundling for transmitting the PUCCH when there is a collision between a discovery and a PUCCH subframe is as follows for a FDD system: on subframe A+1, UE generates ACK/NAKs for DL packets sent in subframes A−3 and A−4 (since A is the D2D discovery subframe), thus transmits (a(A−3) AND a(A−4)) on subframe A+1. For a TDD system, the solution is the same, except that there could be more than 2 ACK/NAKs sent on subframe A+1. The UE would then bundle all the cellular ACK/NAKs to be sent on subframe A+1 (where b is the bundling of all cellular ACK/NAKs, including a(A−3)), and bundle it with the delayed ACK/NAK due to the discovery subframe, and would send (a(A−4) AND b).

If TDD rules with multiplexing or CS were used, similar extensions would be defined. Note that with multiplexing, the number of ACK/NAK bits may grow beyond the capacity of the PUCCH, which at some point in time may require the joint use of multiplexing and bundling by the UE, or just bundling by the UE.

If the cellular system uses carrier aggregation (CA), and D2D discovery is performed on a single carrier among the carriers in the aggregation, the CA ACK/NAK rules may be used as well. In that case the TDD rule for reporting the ACK/NAK on the discovery subframe may apply only for the carrier on which D2D discovery is performed.

If the subframe A is not a discovery subframe (block 510), the UE may encode the PUCCH for subframe A using FDD rules (a first encoding rule) (block 525). The UE may transmit the PUCCH in the subframe A (block 530).

Figure 6:
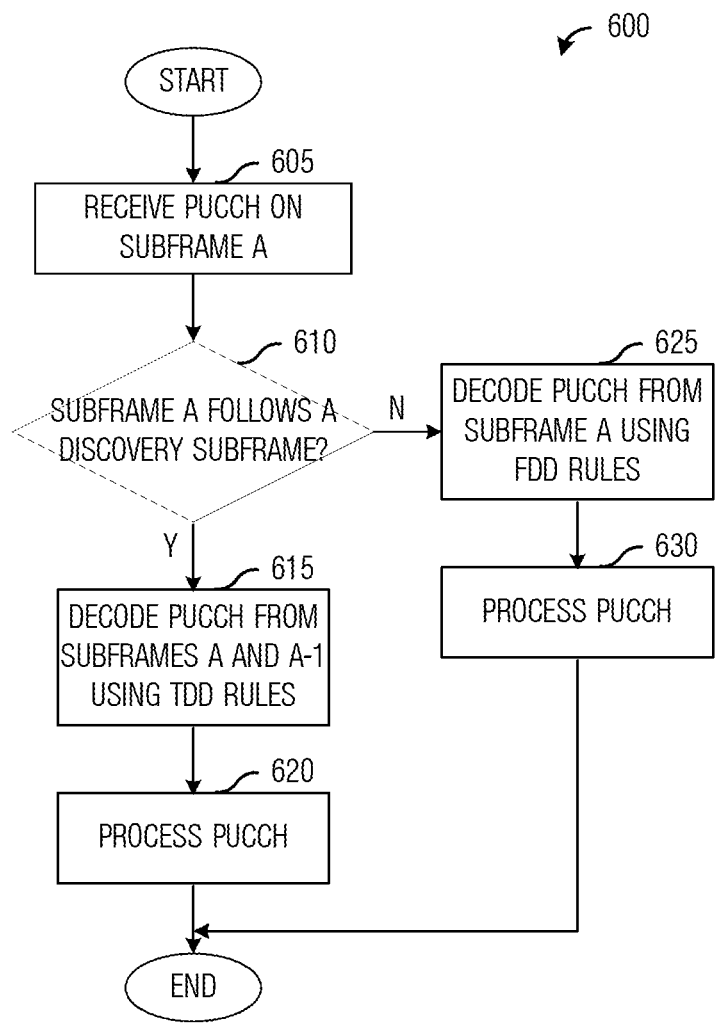
FIG. 6 illustrates a flow diagram of example operations occurring in an eNB receiving a PUCCH according to example embodiments described herein.

FIG. 6 illustrates a flow diagram of example operations 600 occurring in an eNB receiving a PUCCH. Operations 600 may be indicative of operations occurring in an eNB as the eNB receives a PUCCH.

Operations 600 may begin with the eNB receiving a PUCCH on a subframe A (block 605). The eNB may perform a check to determine if subframe A follows a discovery subframe (block 610). If the subframe A does follow a discovery subframe, then the PUCCH was transmitted by a UE with knowledge of D2D operation and was trying to avoid a collision with the discovery subframe. The eNB may decode the PUCCH from subframes A and subframe A−1 using TDD rules (block 615). In other words, the eNB decodes the PUCCH using a coding rule used to encode the PUCCH. The eNB may process information in the PUCCH (block 620).

If the subframe A does not follow a discovery subframe, then the eNB may decode the PUCCH from subframe A using FDD rules (block 625). The eNB may process information in the PUCCH (block 630). It is noted that although the discussion of FIG. 6 focuses on subframes being D2D subframes (e.g., D2D discovery subframes), the example embodiments presented herein are also operable for subframes that are configured to be D2D subframes. Therefore, the discussion of subframes being D2D subframes should not be construed as being limiting to either the scope or the spirit of the example embodiments.

The example operations shown in FIGS. 5 and 6 are for FDD communications systems. In a scenario where the communications system is using TDD, the PUCCH may still be sent in the next available UL subframe, but the next available UL subframe may not be the subframe immediately following subframe A. Instead, the next available UL subframe may be several subframes later in time. Furthermore, the ACKs/NAKs for more than 2 subframes may be transmitted together, such as for the discovery subframe and for all the DL subframes that need to be acknowledged at the time.

The transmission of ACKs/NAKs is another issue that can cause interference to discovery subframes. For discussion purposes, consider a situation where a UE has to transmit an UL packet on subframe A, and that subframe A is a D2D discovery subframe. The UL packet would have to be transmitted on a physical uplink shared channel (PUSCH) on subframe A. The interference between D2D discovery signals and PUSCH is likely to be significant, and would often prevent the PUSCH from being correctly received at the eNB. This problem would likely occur in the flowing cases: a transmission was scheduled on subframe A with semi-persistent scheduling, and a retransmission of a previous packet is scheduled on subframe A due to the synchronous nature of UL HARQ.

In the case of legacy UEs, they are unaware of the D2D discovery subframes, and thus would transmit their PUSCH on the discovery subframe. In that case, the eNB may attempt to decode the PUSCH. If it fails, then the eNB sends a NAK to the UE using the physical HARQ indicator channel (PHICH), and accounts for this transmission as 'fail.' Essentially, the existing HARQ procedures for 3GPP LTE Release-11 UEs are used. It is noted however that there may be a loss of performance, because the PUSCH transmission is likely to fail and be a wasted transmission.

According to an example embodiment, UEs that are aware of D2D discovery subframes are able to avoid wasting the transmission by determining if the subframe is a D2D discovery subframe and behave accordingly. If the subframe is not a D2D discovery subframe, the UE may transmit the packet on the PUSCH using existing procedures. If the subframe is a D2D discovery subframe, the HARQ process may be put on hold and the UE does not transmit its scheduled PUSCH. Then, on a subsequent subframe that is scheduled for transmission by the HARQ process put on hold, the UE transmits a redundant version of what it was supposed to transmit on the D2D discovery subframe and any other transmission related to the HARQ process.

Figure 7:
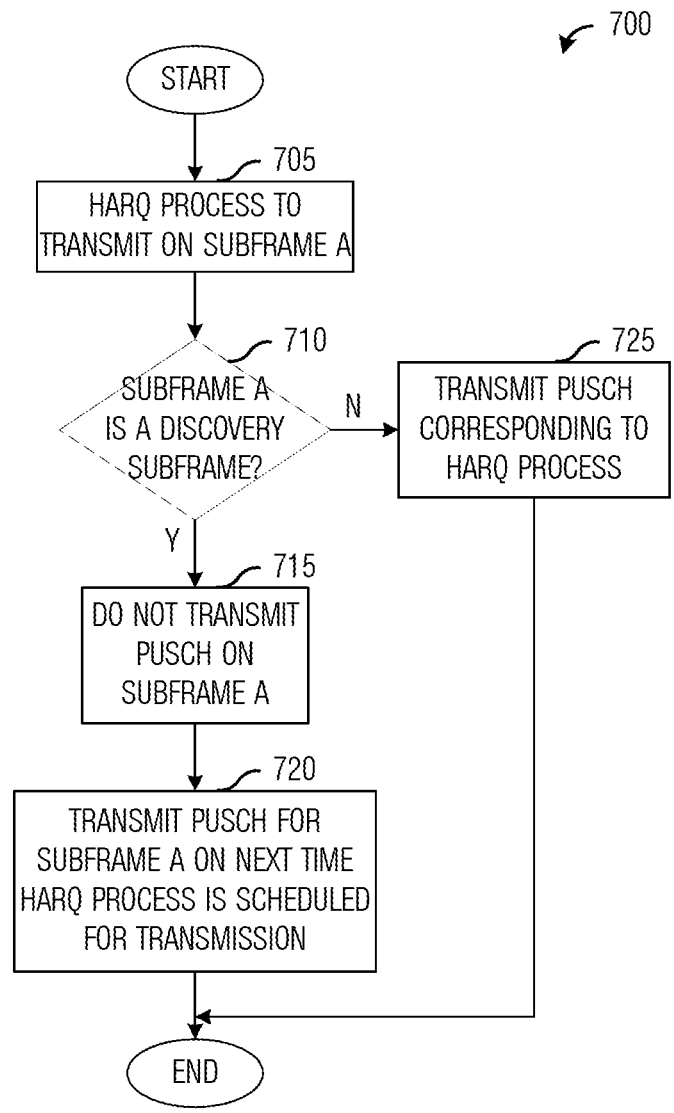
FIG. 7 illustrates a flow diagram of example operations occurring in a UE sending a PUSCH in a FDD communications system according to example embodiments described herein.

FIG. 7 illustrates a flow diagram of example operations 700 occurring in a UE sending a PUSCH in a FDD communications system. Operations 700 may be indicative of operations occurring in a UE as the UE sends a PUSCH in a FDD communications system.

Operations 700 may begin with a HARQ process being configured to transmit on subframe A and with a PUSCH to transmit, the HARQ process is executing on the UE (block 705). The UE may perform a check to determine if the subframe A is a discovery subframe (block 710). If the subframe A is a discovery subframe, the UE may not transmit the PUSCH on the subframe A (block 715). The UE also does not expect an ACK/NAK associated with the PUSCH from the eNB. Instead of transmitting the PUSCH, the UE holds the PUSCH until a next subframe in which the HARQ process is configured to transmit arrives. The UE may transmit a redundant version of the held PUSCH on the next subframe in which the HARQ process is configured to transmit (block 720). The UE may also transmit a PUSCH for the HARQ process if the HARQ process has an additional PUSCH that has come up since subframe A and the next subframe.

If the subframe A is not a discovery subframe, the UE may transmit the PUSCH in the subframe A (block 725). The UE may use existing legacy procedures, e.g., 3GPP LTE Release-11 procedures, to transmit the PUSCH. It is noted that although the discussion of FIG. 7 focuses on subframes being D2D subframes (e.g., D2D discovery subframes), the example embodiments presented herein are also operable for subframes that are configured to be D2D subframes. Therefore, the discussion of subframes being D2D subframes should not be construed as being limiting to either the scope or the spirit of the example embodiments.

Figure 8:
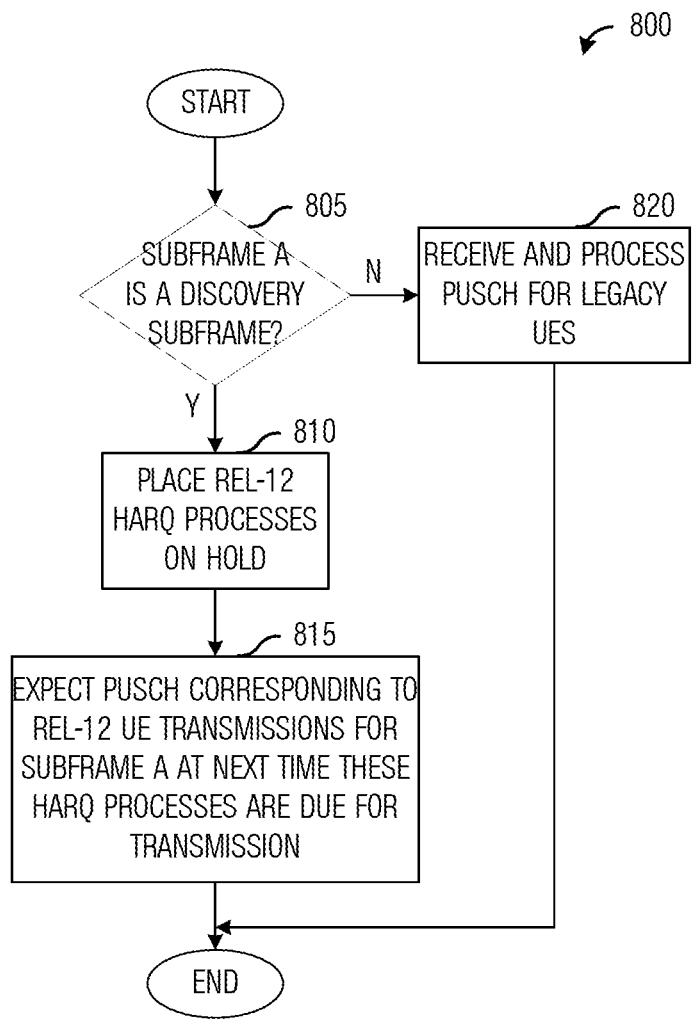
FIG. 8 illustrates a flow diagram of example operations occurring in an eNB receiving a PUSCH in a FDD communications system according to example embodiments described herein.

FIG. 8 illustrates a flow diagram of example operations 800 occurring in an eNB receiving a PUSCH in a FDD communications system. Operations 800 may be indicative of operations occurring in an eNB as the eNB receives a PUSCH in a FDD communications system.

Operations 800 may begin with the eNB performing a check to determine if a subframe A is a discovery subframe (block 805). If the subframe A is a discovery subframe, the eNB may place HARQ processes for discovery aware UEs (e.g., 3GPP LTE Release-12 and later UEs) on hold (block 810). The eNB may not attempt any decoding of transmissions occurring in the subframe A. Furthermore, the eNB may not generate any ACKs/NAKs for the HARQ processes. On a next subframe in which the HARQ processes that were put on hold are expected to transmit, the eNB may expect the PUSCH transmissions that it had expected to occur during the subframe A (block 815). If the subframe A is not a discovery subframe, the eNB may receive the subframe A and process any PUSCH(s) from UEs, such as legacy UEs, using legacy procedures (e.g., 3GPP LTE Release-11 procedures) (block 820). It is noted that although the discussion of FIG. 8 focuses on subframes being D2D subframes (e.g., D2D discovery subframes), the example embodiments presented herein are also operable for subframes that are configured to be D2D subframes. Therefore, the discussion of subframes being D2D subframes should not be construed as being limiting to either the scope or the spirit of the example embodiments.

The example techniques presented in FIGS. 7 and 8 may help to prevent wasted HARQ transmissions by simply placing them on hold when they are scheduled to occur on discovery subframes. The resulting delay may slightly increase the total transmission time by delaying the HARQ process involved with the transmission.

The example operations shown in FIGS. 7 and 8 are for FDD communications systems. In a scenario where the communications system is using TDD, the PUSCH may still be sent in the next available UL subframe, but the next available UL subframe may not be the subframe immediately following subframe A. Instead, the next available UL subframe may be several subframes later in time. Furthermore, the ACKs/NAKs for more than 2 subframes may be transmitted together, such as for the discovery subframe and for all the DL subframes that need to be acknowledged at the time.

There may be considerations for the transmission of ACKs/NAKs for DL HARQ as illustrated in Table 1. In some instances, there may be priority rules for CQI. The CQI intended on subframe A may not be transmitted in subframe A+1 due to size constraints or existing CQI in subframe A+1.

TABLE 1

Additional ACK/NAK mapping rules

| ACK/NAK resources in subframe A | UL transmission in subframe A + 1 | ACK/NAK resources in subframe A + 1 | Possible ACK/NAK operation for subframe A + 1 |
|---|---|---|---|
| PUSCH with embedded control | PUSCH (no embedded control [no ACK/NAK]) | PUSCH with embedded control | Transfer ACK/NAK intended on subframe A to subframe A + 1 |
| | PUSCH with embedded control [ACK/NAK] | PUSCH with embedded control | Bundle ACK/NAK of subframe A with ACK/NAK of subframe A + 1 |
| | None | PUCCH with ACK/NAK | Transfer ACK/NAK intended on subframe A to subframe A + 1 |
| | PUCCH (no ACK/NAK) | PUCCH with ACK/NAK | Transfer ACK/NAK intended on subframe A to subframe A + 1 |
| PUCCH | PUSCH (no embedded control [no ACK/NAK]) | PUSCH with embedded control | Transfer ACK/NAK intended on subframe A to subframe A + 1 |
| | PUSCH with embedded control [ACK/NAK] | PUSCH with embedded control | Bundle ACK/NAK of subframe A with ACK/NAK of subframe A + 1 |
| | PUCCH (no ACK/NAK) | PUCCH with ACK/NAK | Transfer ACK/NAK intended on subframe A to subframe A + 1 |

Figure 9:
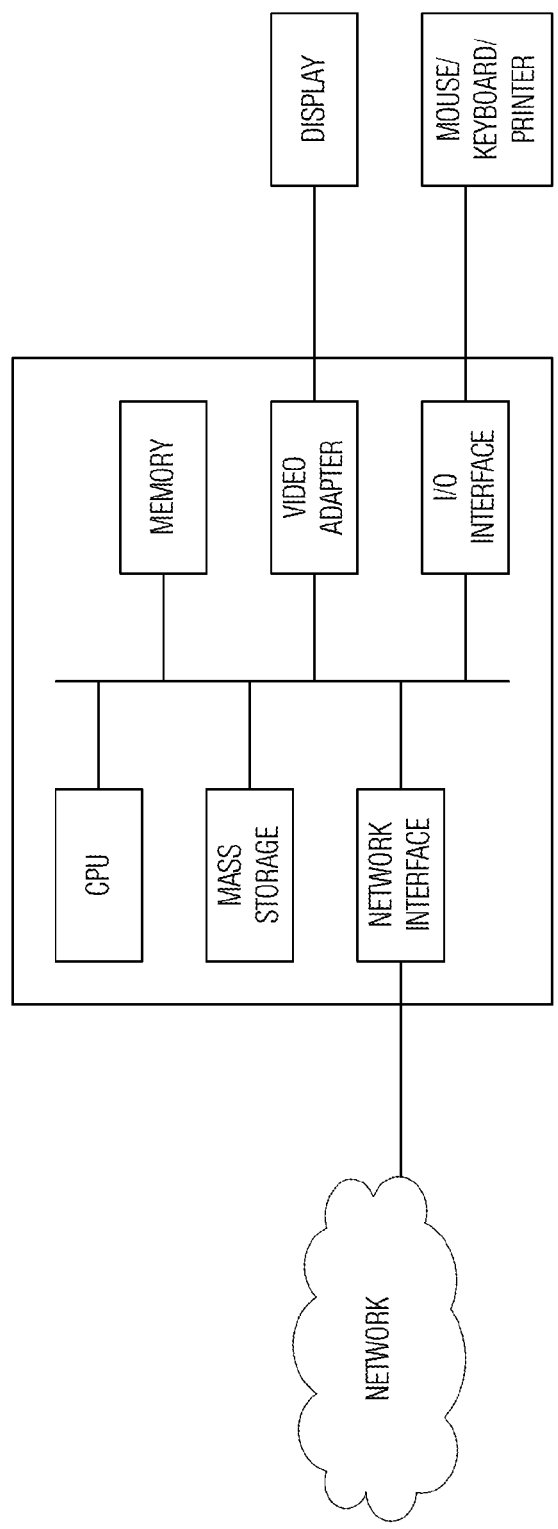
FIG. 9 is a block diagram of a processing system that may be used for implementing the devices and methods disclosed herein.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for signaling first control information in a communications system, the method comprising:
    identifying, by a user equipment (UE), a first subframe to carry the first control information;
    determining, by the UE, whether the first subframe is configured as a device-to-device (D2D) subframe;
    transmitting, by the UE, the first control information in the first subframe to an evolved NodeB (eNB) when the first subframe is not configured as a D2D subframe, wherein the first control information is encoded with a first encoding rule in accordance with the first subframe; and
    transmitting, by the UE, the first control information in a second subframe when the first subframe is configured as a D2D subframe, wherein the first control information is encoded with a second encoding rule in accordance with the second subframe.

2. The method of claim 1, wherein the first control information comprises an acknowledgement of a received packet.

3. The method of claim 1, wherein the second subframe is not configured as a D2D subframe.

4. The method of claim 1, wherein the first subframe is configured as a D2D discovery subframe.

5. The method of claim 1, wherein the second encoding rule comprises encoding the first control information along with second control information of the second subframe when the second control information is available.

6. The method of claim 5, wherein the encoding comprises bundling.

7. The method of claim 1, wherein the communications system is a frequency division duplexed network, and wherein the first encoding rule comprises encoding the first control information in accordance with a frequency division duplex (FDD) rule, and the second encoding rule comprises encoding the first control information in accordance with a time division duplex (TDD) rule.

8. The method of claim 1, wherein the second subframe comprises a subframe immediately following the first subframe.

9. The method of claim 1, wherein the second subframe comprises a first occurrence of a subframe not configured as a D2D subframe following the first subframe.

10. The method of claim 1, wherein the communications system is a time division duplexed network, and wherein the first encoding rule comprises encoding the first control information in accordance with a first time division duplex (TDD) rule, and the second encoding rule comprises encoding the first control information in accordance with a second TDD rule.

11. The method of claim 1, wherein the second subframe comprises a subframe following the first subframe that is configured for uplink transmission and is not configured as a D2D subframe.

12. The method of claim 1, wherein the method further comprises disallowing the transmitting the first control information in the first subframe when the first subframe is configured as a D2D subframe.

13. The method of claim 1, wherein the first control information is one of a hybrid automatic repeat requested acknowledgement (ACK) and a hybrid automatic repeat requested negative acknowledgement (NAK).

14. The method of claim 1, wherein the control information is carried on a physical uplink control channel.

15. A method for receiving control information in a communications system, the method comprising:
    receiving, by an evolved NodeB (eNB), encoded control information in a first subframe;
    determining, by the eNB, a coding rule used in encoding the control information, wherein the coding rule is one of a first coding rule and a second coding rule; and
    decoding, by the eNB, the encoded control information in accordance with the coding rule to produce the control information, wherein the second coding rule is used as the coding rule when the control information comprises second control information scheduled for a second subframe configured as a device-to-device (D2D) subframe and when the second control information was not received in the second subframe.

16. The method of claim 15, wherein the second control information comprises an acknowledgement corresponding to a transmitted packet.

17. The method of claim 15, wherein the first subframe is not configured as a D2D subframe.

18. The method of claim 15, wherein the second subframe is configured as a D2D discovery subframe.

19. The method of claim 15 wherein the control information further comprising first control information scheduled for the first subframe, and wherein the first control information and the second control information are jointly encoded.

20. The method of claim 19, wherein the first control information and the second control information are bundled.

21. The method of claim 15, wherein the communications system is a frequency division duplexed network, and wherein the first coding rule comprises encoding the control information in accordance with a frequency division duplex (FDD) rule, and the second coding rule comprises encoding the second control information in accordance with a time division duplex (TDD) rule.

22. The method of claim 15, wherein the second subframe comprises a subframe immediately preceding the first subframe.

23. The method of claim 15, wherein the communications system is a time division duplexed network, and wherein the first coding rule comprises encoding the control information in accordance with a first time division duplex (TDD) rule, and the second coding rule comprises encoding the second control information in accordance with a second TDD rule.

24. The method of claim 15, wherein the second control information comprises one of a hybrid automatic repeat requested acknowledgement (ACK) and a hybrid automatic repeat requested negative acknowledgement (NAK).

25. The method of claim 15, wherein the control information is carried on a physical uplink control channel.

26. A user equipment (UE) adapted to signal first control information in a communications system, the UE comprising:
  a processor; and
  a computer readable storage medium storing programming for execution by the processor, the programming including instructions to,
    identify a first subframe to carry the first control information,
    determine whether the first subframe is configured as a device-to-device (D2D) subframe,
    transmit the first control information in the first subframe to an evolved NodeB (eNB) when the first subframe is not configured as a D2D subframe, wherein the first control information is encoded with a first encoding rule in accordance with the first subframe, and
    transmit the first control information over a second subframe when the first subframe is configured as a D2D subframe, wherein the first control information is encoded with a second encoding rule in accordance with the second subframe.

27. The UE of claim 26, wherein the programming includes instructions to encode the first control information along with second control information of the second subframe when the second control information is available.

28. The UE of claim 26, wherein the communications system is a frequency division duplexed network, and wherein the programming includes instructions to encode the first control information in accordance with a frequency division duplex (FDD) rule, and the second encoding rule comprises encoding the first control information in accordance with a time division duplex (TDD) rule.

29. The UE of claim 26, wherein the communications system is a time division duplexed network, and wherein the programming includes instructions to encode the first control information in accordance with a first time division duplex (TDD) rule, and the second encoding rule comprises encoding the first control information in accordance with a second TDD rule.

30. The UE of claim 26, wherein the programming includes instructions to disallow transmitting of the first control information in the first subframe when the first subframe is configured as a D2D subframe.

31. An evolved NodeB (eNB) adapted to signal control information in a communications system, the eNB comprising:
  a processor; and
  a computer readable storage medium storing programming for execution by the processor, the programming including instructions to,
    receive encoded control information in a first subframe,
    determine a coding rule used in encoding the control information, wherein the coding rule is one of a first coding rule and a second coding rule, and
    decode the encoded control information in accordance with the coding rule to produce the control information, wherein the second coding rule is used as the coding rule in encoding when the control information comprises second control information scheduled for a second subframe configured as a device-to-device (D2D) subframe and when the second control information was not received in the second subframe.

32. The eNB of claim 31, wherein the communications system is a frequency division duplexed network, and wherein the programming includes instructions to encode the control information in accordance with a frequency division duplex (FDD) rule, and the second coding rule comprises encoding the second control information in accordance with a time division duplex (TDD) rule.

33. The eNB of claim 31, wherein the communications system is a time division duplexed network, and wherein the programming includes instructions to encode the control information in accordance with a first time division duplex (TDD) rule, and the second coding rule comprises encoding the second control information in accordance with a second TDD rule.

* * * * *